United States Patent
Huang et al.

(10) Patent No.: US 8,014,997 B2
(45) Date of Patent: Sep. 6, 2011

(54) METHOD OF SEARCH CONTENT ENHANCEMENT

(75) Inventors: Chen-Yu Huang, Taipei (TW); Noon Ju Kim, Wappingers Falls, NY (US); Chien-Chiao Tu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 1010 days.

(21) Appl. No.: 10/664,449

(22) Filed: Sep. 20, 2003

(65) Prior Publication Data

US 2005/0065773 A1    Mar. 24, 2005

(51) Int. Cl.
*G06F 17/28* (2006.01)
(52) U.S. Cl. .................. 704/7; 704/8; 704/9; 704/10
(58) Field of Classification Search .................. 707/3–5; 704/7–10
See application file for complete search history.

(56) References Cited

U.S. PATENT DOCUMENTS

| | | |
|---|---|---|
| 5,136,505 A | 8/1992 | Inamori et al. |
| 5,398,302 A | 3/1995 | Thrift |
| 5,499,366 A | 3/1996 | Rosenberg et al. |
| 5,737,734 A | 4/1998 | Schultz |
| 5,794,178 A | 8/1998 | Caid et al. |
| 5,819,263 A | 10/1998 | Bromley et al. |
| 5,878,423 A | 3/1999 | Anderson et al. |
| 5,893,092 A | 4/1999 | Driscoll |
| 5,899,991 A | 5/1999 | Karch |
| 5,956,708 A | 9/1999 | Dyko et al. |
| 5,956,711 A | 9/1999 | Sullivan et al. |
| 5,956,740 A | 9/1999 | Nosohara |
| 5,987,457 A | 11/1999 | Ballard |
| 5,991,713 A | 11/1999 | Unger et al. |
| 6,005,860 A | 12/1999 | Anderson et al. |
| 6,008,817 A | 12/1999 | Gilmore, Jr. |

(Continued)

FOREIGN PATENT DOCUMENTS

EP    0851368 A2    12/1997

(Continued)

OTHER PUBLICATIONS

U.S. Appl. No. 10/664,450, filed Sep. 20, 2003, Amendment to Dec. 18, 2009 Office Action, filed Mar. 17, 2010.

(Continued)

*Primary Examiner* — Leonard Saint Cyr
(74) *Attorney, Agent, or Firm* — Andrea Bauer; Hoffman Warnick LLC

(57) ABSTRACT

Whenever a document is going to be included into the textual database, a semantic binder is used to associate the document with one or more semantic nodes which are defined in a semantic taxonomy. When a search is performed, a search application looks through a semantic dictionary (which contains a table mapping queries to nodes on the semantic taxonomy) to see whether any corresponding semantic node can be found for the searchers query. If a match is found, the search application transforms the user's query into ["original query" OR "semantic node"] so that relevant documents, even they do not contain any user's keyword, can also be found in the database. The system binds semantic nodes arranged in a hierarchical structure of the taxonomy using a Log Analyzer which periodically looks through the system log for new queries and through textual indices for documents added to the database to generate the semantic dictionary and to bind the semantic nodes to the queries in the textual indices of the documents.

14 Claims, 10 Drawing Sheets

U.S. PATENT DOCUMENTS

| | | | |
|---|---|---|---|
| 6,041,326 A | 3/2000 | Amro et al. | |
| 6,055,528 A | 4/2000 | Evans | |
| 6,065,026 A | 5/2000 | Cornelia et al. | |
| 6,081,774 A | 6/2000 | de Hita et al. | |
| 6,085,162 A | 7/2000 | Cherny | |
| 6,085,186 A | 7/2000 | Christianson et al. | |
| 6,094,647 A | 7/2000 | Kato et al. | |
| 6,102,969 A | 8/2000 | Christianson et al. | |
| 6,111,572 A | 8/2000 | Blair et al. | |
| 6,141,005 A | 10/2000 | Hetherington et al. | |
| 6,163,785 A | 12/2000 | Carbonell et al. | |
| 6,169,986 B1 | 1/2001 | Bowman et al. | |
| 6,219,646 B1 | 4/2001 | Cherny | |
| 6,226,638 B1 | 5/2001 | Okura et al. | |
| 6,237,011 B1 | 5/2001 | Ferguson et al. | |
| 6,240,408 B1 | 5/2001 | Kaufman | |
| 6,240,412 B1 | 5/2001 | Dyko et al. | |
| 6,259,933 B1 | 7/2001 | Bambridge et al. | |
| 6,262,725 B1 | 7/2001 | Hetherington et al. | |
| 6,275,789 B1 | 8/2001 | Moser et al. | |
| 6,275,810 B1 | 8/2001 | Hetherington et al. | |
| 6,278,967 B1 | 8/2001 | Akers et al. | |
| 6,327,590 B1 | 12/2001 | Chidlovskii et al. | |
| 6,338,055 B1 | 1/2002 | Hagmann et al. | |
| 6,349,307 B1 | 2/2002 | Chen | |
| 6,360,196 B1 | 3/2002 | Poznanski et al. | |
| 6,424,973 B1 | 7/2002 | Baclawski | |
| 6,453,159 B1 | 9/2002 | Lewis | |
| 6,463,430 B1 | 10/2002 | Brady et al. | |
| 6,516,312 B1 | 2/2003 | Kraft et al. | |
| 6,523,026 B1 | 2/2003 | Gillis | |
| 6,526,440 B1 | 2/2003 | Bharat | |
| 6,560,634 B1 | 5/2003 | Broadhurst | |
| 6,571,249 B1 * | 5/2003 | Garrecht et al. | 707/100 |
| 6,581,072 B1 | 6/2003 | Mathur et al. | |
| 6,602,300 B2 | 8/2003 | Ushioda et al. | |
| 6,604,099 B1 | 8/2003 | Chung et al. | |
| 6,604,101 B1 | 8/2003 | Chan et al. | |
| 6,629,097 B1 | 9/2003 | Keith | |
| 6,636,848 B1 | 10/2003 | Aridor et al. | |
| 6,643,661 B2 | 11/2003 | Polizzi et al. | |
| 6,654,734 B1 | 11/2003 | Mani et al. | |
| 6,711,568 B1 | 3/2004 | Bharat et al. | |
| 6,718,333 B1 | 4/2004 | Matsuda | |
| 6,738,764 B2 | 5/2004 | Mao et al. | |
| 6,738,767 B1 | 5/2004 | Chung et al. | |
| 6,766,316 B2 | 7/2004 | Caudill et al. | |
| 6,772,150 B1 | 8/2004 | Whitman et al. | |
| 6,778,979 B2 | 8/2004 | Grefenstette et al. | |
| 6,813,496 B2 | 11/2004 | Numminen et al. | |
| 6,829,599 B2 | 12/2004 | Chidlovskii | |
| 6,836,777 B2 | 12/2004 | Holle | |
| 6,901,399 B1 * | 5/2005 | Corston et al. | 1/1 |
| 6,928,432 B2 | 8/2005 | Fagan et al. | |
| 6,941,294 B2 | 9/2005 | Flank | |
| 6,952,691 B2 | 10/2005 | Drissi et al. | |
| 7,027,974 B1 | 4/2006 | Busch et al. | |
| 7,039,625 B2 | 5/2006 | Kim et al. | |
| 7,051,023 B2 | 5/2006 | Kapur et al. | |
| 7,117,199 B2 | 10/2006 | Frank et al. | |
| 7,124,364 B2 | 10/2006 | Rust et al. | |
| 7,127,456 B1 | 10/2006 | Brown et al. | |
| 7,136,845 B2 | 11/2006 | Chandrasekar et al. | |
| 7,174,564 B1 | 2/2007 | Weatherspoon et al. | |
| 7,197,508 B1 | 3/2007 | Brown, III | |
| 7,318,057 B2 | 1/2008 | Aridor et al. | |
| 2001/0021947 A1 | 9/2001 | Kim | |
| 2002/0002452 A1 | 1/2002 | Christy et al. | |
| 2002/0007364 A1 | 1/2002 | Kobayashi et al. | |
| 2002/0007384 A1 | 1/2002 | Ushioda et al. | |
| 2002/0016787 A1 | 2/2002 | Kanno | |
| 2002/0042789 A1 | 4/2002 | Michalewicz et al. | |
| 2002/0059289 A1 | 5/2002 | Wenegrat et al. | |
| 2002/0091671 A1 | 7/2002 | Prokoph | |
| 2002/0095594 A1 | 7/2002 | Dellmo et al. | |
| 2002/0095621 A1 | 7/2002 | Lawton | |
| 2002/0107992 A1 | 8/2002 | Osbourne et al. | |
| 2002/0156776 A1 | 10/2002 | Davallou | |
| 2002/0156792 A1 | 10/2002 | Gombocz et al. | |
| 2002/0184206 A1 | 12/2002 | Evans | |
| 2003/0126136 A1 * | 7/2003 | Omoigui | 707/10 |
| 2003/0142128 A1 | 7/2003 | Reulein et al. | |
| 2003/0144982 A1 | 7/2003 | Reulein et al. | |
| 2003/0149686 A1 | 8/2003 | Drissi et al. | |
| 2003/0149687 A1 | 8/2003 | Brown et al. | |
| 2003/0177111 A1 | 9/2003 | Egendorf et al. | |
| 2003/0221171 A1 | 11/2003 | Rust et al. | |
| 2003/0225722 A1 | 12/2003 | Brown et al. | |
| 2003/0225747 A1 | 12/2003 | Brown et al. | |
| 2004/0019588 A1 | 1/2004 | Doganata et al. | |
| 2004/0024745 A1 | 2/2004 | Jeng et al. | |
| 2004/0024748 A1 | 2/2004 | Brown et al. | |
| 2004/0030690 A1 | 2/2004 | Teng et al. | |
| 2004/0044669 A1 | 3/2004 | Brown et al. | |
| 2004/0068486 A1 | 4/2004 | Chidlovskii | |
| 2004/0111408 A1 | 6/2004 | Caudill et al. | |
| 2004/0181511 A1 * | 9/2004 | Xu et al. | 707/3 |
| 2004/0181525 A1 | 9/2004 | Itzhak et al. | |
| 2004/0205656 A1 | 10/2004 | Reulein et al. | |
| 2004/0214570 A1 | 10/2004 | Zhang et al. | |
| 2004/0220905 A1 * | 11/2004 | Chen et al. | 707/3 |
| 2004/0249808 A1 | 12/2004 | Azzam et al. | |
| 2004/0254920 A1 | 12/2004 | Brill et al. | |
| 2005/0055341 A1 | 3/2005 | Haahr et al. | |
| 2005/0065773 A1 | 3/2005 | Huang et al. | |
| 2005/0065774 A1 | 3/2005 | Doganata et al. | |
| 2005/0154708 A1 * | 7/2005 | Sun | 707/3 |
| 2006/0036588 A1 | 2/2006 | Frank et al. | |
| 2006/0191996 A1 | 8/2006 | Drummond et al. | |
| 2009/0036159 A1 | 2/2009 | Chen | |

FOREIGN PATENT DOCUMENTS

| | | |
|---|---|---|
| EP | 0964344 A2 | 5/1999 |
| EP | 1072984 A2 | 1/2001 |
| JP | 10187752 | 7/1998 |
| JP | 11219368 | 8/1999 |
| WO | 0201400 A1 | 1/2002 |

OTHER PUBLICATIONS

U.S. Appl. No. 10/664,450, filed Sep. 20, 2003, Office Action dated Dec. 18, 2009.

Doganata et al., "dBlue—An Advanced Enterprise Information Search and Delivery System", http://websphere.sys-con.com/read/43255.htm, Jan. 1, 2000, 18 pages.

Mujoo et al., "Electronic Commerce and Web Technologies", Proceedings of International Conference, 1st, London, Sep. 4-6, 2000, Lecture Notes in Computer Science, vol. 1875, 9 pages.

Kolmanovskaia, IEEE/POPOV Workshop on Internet Technologies and Services, Oct. 25-28, 1999, pp. 157-158.

Tjoa et al., Proceedings of the 11th International Workshop on Database and Expert Systems Applications, Sep. 4-8, 2000, 6 pages.

IBM Technical Disclosure Bulletin, "Language-Sensitive Search Techniques", vol. 35, No. 4A, Sep. 1992, 2 pages.

IBM Technical Disclosure Bulletin, X/Open Message Translation Tool (Xaltu) for AIX, vol. 38, No. 03, Mar. 1995, 6 pages.

Lyon, "Language Related Problems in the IPC and Search Systems Using Natural language", World Patent Information, vol. 21, Issue No. 2, Jun. 1999, pp. 89-95.

Dimec et al., "WWW Search Engine for Slovenian and English Medical Documents", Studies in Health Technology and Informatics 0926-9630; 1999, vol. 68, pp. 547-552.

Chuanxiang et al., "Design and Implementation of Data Acquisition in WWW-based Chinese-English Search Engine", vol. 20, Issue 5, May 1999, pp. 339-342.

Large et al., "Multilingual Access to Web Resources: An Overview", Program, vol. 34, No. 1, Jan. 2000, pp. 43-58.

DIMEC et al., "Search Engine for Slovenian and English Medical Documents", World Congress on Medical Informatics, 15th, Lubljana, Slovenia, Oct. 6-9, 1998, Medical Informatics Europe '99, pp. 547-548.

Drissi, U.S. Appl. No. 11/151,047, Office Action Communication, CHA920010023US2, Jan. 29, 2008, 8 pages.

Drissi, U.S. Appl. No. 11/151,047, Notice of Allowance & Fees Due, CHA920010023US2, May 8, 2008, 4 pages.

Drissi, U.S. Appl. No. 11/151,047, Office Action Communication, CHA920010023US2, Aug. 15, 2007, 15 pages.

Drissi, U.S. Appl. No. 10/066,346, Office Action Communication, CHA920010023US1, Jun. 21, 2004, 11 pages.

Drissi, U.S. Appl. No. 10/066,346, Office Action Communication, CHA920010023US1, Feb. 4, 2005, 8 pages.

Drissi, U.S. Appl. No. 10/066,346, Notice of Allowance & Fees Due, CHA920010023US1, May 26, 2005, 7 pages.

Large et al., "Multilingual Access to Web Resources: An Overview", Program, vol. 34, No. 1, Jan. 2000, pp. 43-58.

IBM Corporation, "The Nexus—A Unique Way to Allow the Sharing of Objects in Multiple Application Spaces", Research Disclosure, Feb. 2002, 1 page.

Dwivedi, U.S. Appl. No. 10/664,450, Office Action Communication, CHA920030010US1, Apr. 17, 2008, 37 pages.

Woo, U.S. Appl. No. 12/195,829, Office Action Communication, CHA920010023US3, Oct. 14, 2010, 20 pages.

Cheung et al., "The Model-Assisted Global Query System for Multiple Databases in Distributed Enterprises," Jul. 1994.

Lin et al., "An Automatic Indexing and Neural Network Approach to Concept Retrieval and Classification of Multilingual (Chinese-English) Documents", IEEE, 1996.

Hull et al., "Querying Across Languages: A Dictionary-Based Approach to Multilingual Information Retrieval", Special Interest Group on Information Retrieval, 1996, Zurich.

Vossen, Piek, "EuroWordNet: a multilingual database for information retrieval", DELOS Workshop on Cross-language Information Retrieval, Mar. 5-7, 1997, Zurich.

Yergeau et al., "RFC2279-UTF-8, a transformation format of ISO 10646", Copyright the Internet Society, 1998.

Cooper et al., "OBIWAN—A Visual Interface for Prompted Query Refinement", Copyright 1998 by the IEEE.

Jain et al., "Data Clustering: A Review", ACM Computing Surveys, vol. 31, No. 3, Sep. 1999.

Ziviani et al., "Compression: A Key for Next-Generation Text Retrieval Systems", Institute of Electrical and Electronics Engineers, Nov. 2000.

Vilalta et al., "A Perspective View and Survery of Meta-Learning", Kluwer Academic Publishers, 2001, Netherlands.

Peters et al., "Multilingual access for information systems", 67th IFLA Council and General Conference, Aug. 16-25, 2001.

Lam et al., "A Meta-Learning Approach for Text Categorization", Special Interest Group on Information Retrieval, Sep. 9-12, 2001, New Orleans, Louisiana.

U.S. Appl. No. 10/459,964, filed Jun. 12, 2003. Final Office Action dated May 13, 2010.

Stephenson et al., "Meta Optimization: Improving Compiler Heuristics with Machine Learning", Program Language Design and Implementation, Jun. 9-11, 2003, San Diego, California.

Siersdorfer et al., "Restrictive Clustering and Metaclustering for Self-Organizing Document Collections", Special Interest Group on Information Retrieval, Jul. 25-29, 2004, Sheffield, South Yorkshire, UK.

Holmes et al., "Integrating Metdata Tools with the Data Services Archive to Provide Web-based Management of Large-Scale Scientific Simulation Data", Proceedings of the 37th Annual Simulation Symposium, 2004.

U.S. Appl. No. 10/459,964, filed Jun. 12, 2003, Office Action dated Jan. 7, 2008.

U.S. Appl. No. 10/459,964, filed Jun. 12, 2003, Final Office Action dated Aug. 22, 2008.

U.S. Appl. No. 10/459,964, filed Jun. 12, 2003, Office Action dated Dec. 24, 2008.

U.S. Appl. No. 10/459,964, filed Jun. 12, 2003, Notice of Allowance dated Aug. 4, 2010.

U.S. Appl. No. 10/664,450, filed Sep. 20, 2003. Office Action dated Aug. 30, 2010.

Soergel, Dagobert, "Multilingual thesauri in cross-language text and speech retrieval", Working Notes of AAAI Spring Symposium on Cross Language Text and Speech Retrieval, 164-170, Stanford, California.

Schiel et al., "SIM—a System for Semi-Automatic Indexing of Multilingual Documents", Proceedings of the 10th International Workshop on Database and Expert Systems Application, 1999.

Salton, G. "Automatic Processing of Foreign Language Documents", International Conference on Computational . Linguistics, 1-28, 1969.

Brin et al., "The Anatomy of a Large-Scale Hypertextual Web Search Engine", Computer Networks & ISDN System, vol. 30, Issue 1-7, Apr. 1998, 107-117.

Biebow et al., "Terminae: a method and a tool to build a domain ontology", Proceedings of the 11th European Workshop on Knowledge Acquisition, Modelling, and Management, 49-66, Springer Verlag, 1999.

U.S. Appl. No. 10/664,450, filed Sep. 20, 2003, Office Action dated Dec. 12, 2006.

U.S. Appl. No. 10/664,450, filed Sep. 20, 2003, Final Office Action dated Jun. 13, 2007.

U.S. Appl. No. 10/664,450, filed Sep. 20, 2003, Final Office Action dated Nov. 24, 2008.

U.S. Appl. No. 10/664,450, filed Sep. 20, 2003. Final Office Action dated May 12, 2010.

Woo, U.S. Appl. No. 12/195,829, Notice of Allowance & Fees Due, CHA920010023US3, Jan. 11, 2011, 18 pages.

Woo, U.S. Appl. No. 12/195,862, Office Action Communication, CHA920010023US4, Feb. 23, 2011, 38 pages.

Dwivedi, Mahesh H., U.S. Appl. No. 10/664,450, Office Action Communication, CHA920030010US1, Mar. 24, 2011, 54 pages.

U.S. Appl. No. 10/209,619, filed Jul. 31, 2002, Notice of Allowance and Fees Due dated Sep. 8, 2006.

U.S. Appl. No. 10/209,619, filed Jul. 31, 2002, Advisory Action dated Mar. 31, 2006.

U.S. Appl. No. 10/209,619, filed Jul. 31, 2002, Final Office Action dated Dec. 23, 2005.

U.S. Appl. No. 10/209,619, filed Jul. 31, 2002, Office Action dated Feb. 18, 2005.

U.S. Appl. No. 10/229,552, filed Aug. 28, 2002, Notice of Allowance and Fees Due dated May 19, 2006.

U.S. Appl. No. 10/229,552, filed Aug. 28, 2002, Advisory Action dated Feb. 6, 2006.

U.S. Appl. No. 10/229,552, filed Aug. 28, 2002, Advisory Action dated Nov. 15, 2005.

U.S. Appl. No. 10/229,552, filed Aug. 28, 2002, Advisory Action dated Oct. 4, 2005.

U.S. Appl. No. 10/229,552, filed Aug. 28, 2002, Final Office Action dated Jul. 27, 2005.

U.S. Appl. No. 10/229,552, filed Aug. 28, 2002, Office Action dated Jan. 4, 2005.

U.S. Appl. No. 10/302,108, filed Nov. 22, 2002, 312 Amendment dated Nov. 22, 2005.

U.S. Appl. No. 10/302,108, filed Nov. 22, 2002, Notice of Allowance and Fees Due dated Oct. 13, 2005.

U.S. Appl. No. 10/302,108, filed Nov. 22, 2002, Office Action dated May 18, 2005.

U.S. Appl. No. 10/209,112, filed Jul. 31, 2002, Notice of Allowance and Fees Due dated Dec. 23, 2004.

U.S. Appl. No. 10/157,243, filed May 30, 2002, Restriction Requirement dated Apr. 8, 2005.

U.S. Appl. No. 10/157,243, filed May 30, 2002, Office Action dated Sep. 30, 2004.

U.S. Appl. No. 10/202,564, filed Jul. 23, 2002, Notice of Allowance and Fees Due dated Oct. 20, 2009.

U.S. Appl. No. 10/202,564, filed Jul. 23, 2002, Final Office Action dated Jul. 7, 2009.

U.S. Appl. No. 10/202,564, filed Jul. 23, 2002, Office Action dated Nov. 13, 2008.

U.S. Appl. No. 10/202,564, filed Jul. 23, 2002, Final Office Action dated May 28, 2008.

U.S. Appl. No. 10/202,564, filed Jul. 23, 2002, Final Office Action dated Mar. 10, 2008.

U.S. Appl. No. 10/202,564, filed Jul. 23, 2002, Office Action dated Jul. 26, 2007.

U.S. Appl. No. 10/202,564, filed Jul. 23, 2002, Final Office Action dated Feb. 7, 2007.

U.S. Appl. No. 10/202,564, filed Jul. 23, 2002, Office Action dated Aug. 11, 2006.
U.S. Appl. No. 10/202,564, filed Jul. 23, 2002, Advisory Action dated Jan. 10, 2006.
U.S. Appl. No. 10/202,564, filed Jul. 23, 2002, Final Office Action dated Sep. 13, 2005.
U.S. Appl. No. 10/202,564, filed Jul. 23, 2002, Office Action dated Mar. 7, 2005.
U.S. Appl. No. 10/412,808, filed Apr. 11, 2003, Notice of Allowance and Fees Due dated Sep. 19, 2008.
U.S. Appl. No. 10/412,808, filed Apr. 11, 2003, Office Action dated Jan. 28, 2008.
U.S. Appl. No. 10/412,808, filed Apr. 11, 2003, Office Action dated Sep. 11, 2006.
U.S. Appl. No. 10/412,808, filed Apr. 11, 2003, Office Action dated Sep. 23, 2005.
U.S. Appl. No. 10/159,373, filed Jun. 3, 2002, Notice of Allowance and Fees Due dated Apr. 13, 2007.
U.S. Appl. No. 10/159, 373, filed Jun. 3, 2002, Advisory Action dated Sep. 29, 2006.
U.S. Appl. No. 10/159, 373, filed Jun. 3, 2002, Advisory Action dated Aug. 29, 2006.
U.S. Appl. No. 10/159, 373, filed Jun. 3, 2002, Final Office Action dated May 23, 2006.
U.S. Appl. No. 10/159, 373, filed Jun. 3, 2002, Office Action dated Dec. 6, 2005.
U.S. Appl. No. 10/159, 373, filed Jun. 3, 2002, Advisory Action dated Jul. 15, 2005.
U.S. Appl. No. 10/159, 373, filed Jun. 3, 2002, Final Office Action dated Apr. 20, 2005.
U.S. Appl. No. 10/159, 373, filed Jun. 3, 2002, Office Action dated Oct. 18, 2004.
U.S. Appl. No. 10/180,195, filed Jun. 26, 2002, Supplemental Notice of Allowance and Fees Due dated Jan. 29, 2007.
U.S. Appl. No. 10/180,195, filed Jun. 26, 2002, Notice of Allowance and Fees Due dated Nov. 2, 2006.
U.S. Appl. No. 10/180,195, filed Jun. 26, 2002, Office Action dated Jul. 7, 2006.
U.S. Appl. No. 10/180,195, filed Jun. 26, 2002, Advisory Action dated Sep. 2, 2005.
U.S. Appl. No. 10/180,195, filed Jun. 26, 2002, Final Office Action dated Jun. 6, 2005.
U.S. Appl. No. 10/180,195, filed Jun. 26, 2002, Office Action dated Nov. 19, 2004.
U.S. Appl. No. 10/664,450, filed Sep. 20, 2003, Office Action dated Mar. 24, 2011.
Woo, U.S. Appl. No. 12/195,829, Notice of Allowance & Fees Due, CHA920010023US3, May 6, 2011, 14 pages.

* cited by examiner

Dictionary Builder

Semantics Builder

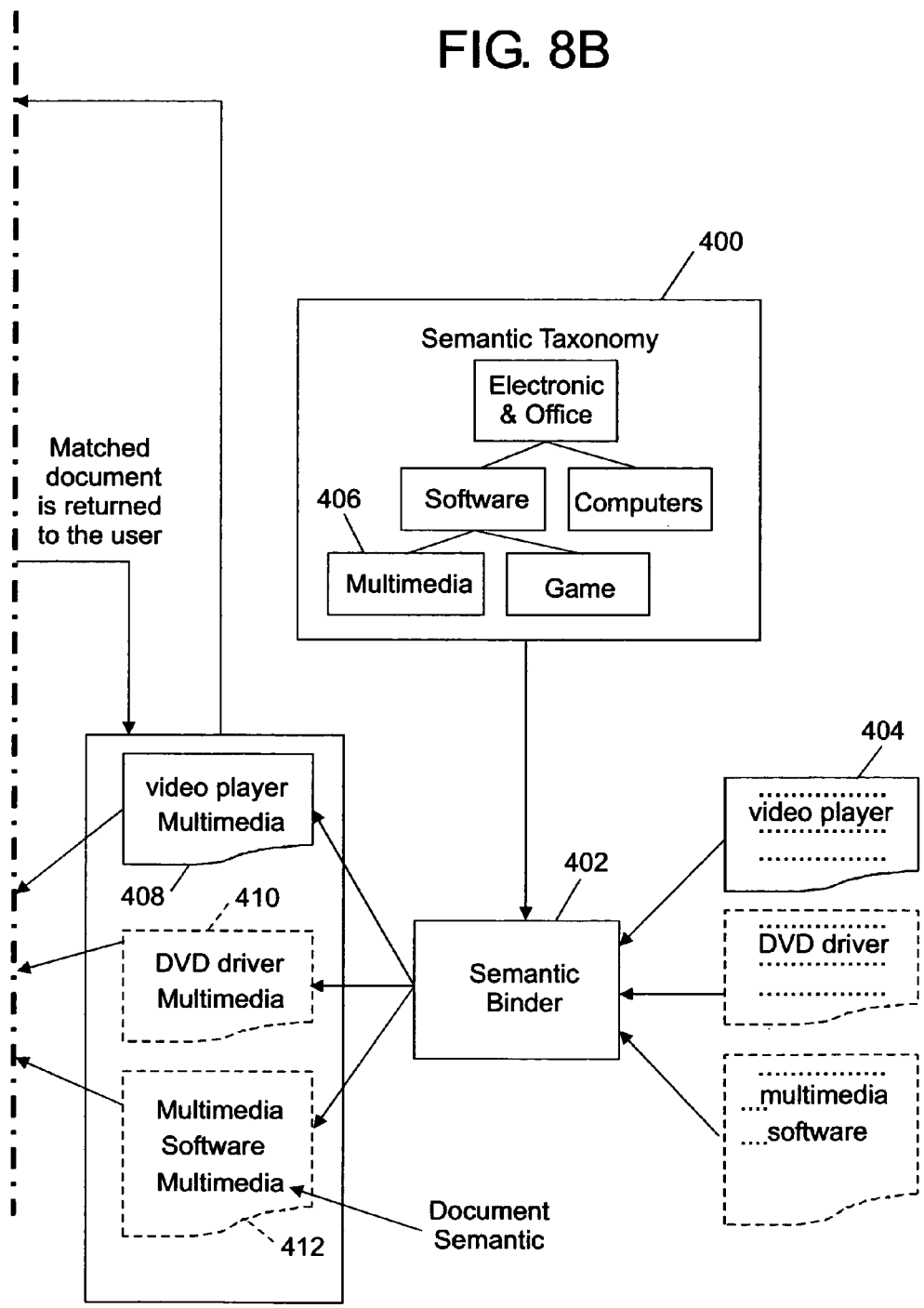

METHOD OF SEARCH CONTENT ENHANCEMENT

RELATED APPLICATIONS

The contents of the following listed applications are hereby incorporated by reference:

(1) U.S. patent application Ser. No. 10/157,243, filed on May 30, 2002 and entitled "Method and Apparatus for Providing Multiple Views of Virtual Documents" which application was published on Dec. 4, 2003 as Publication #US20030225722A1.

(2) U.S. patent application Ser. No. 10/159,373, filed on Jun. 03, 2002 and entitled "A System and Method for Generating and Retrieving Different Document Layouts from a Given Content" which application has now issued as U.S. Pat. No. 7,254,571 on Aug. 17, 2007.

(3) U.S. patent application Ser. No. 10/180,195, filed on Jun. 27, 2002 and entitled "Retrieving Matching Documents by Queries in Any National Language" which application has now been issued as U.S. Pat. No. 7,260,570 on Aug. 21, 2007.

(4) U.S. patent application Ser. No. 10/202,564 filed on Jul. 23, 2002 and entitled "Method of Search Optimization Based on Generation of Context Focused Queries" which application was published Jan. 29, 2004 as Publication #US20040019588A1.

(5) U.S. patent application Ser. No. 10/209,619 filed on Jul. 31, 2002 and entitled "A Method of Query Routing Optimization" which application has now issued as U.S. Pat. No. 7,143,085 on Nov. 28, 2006.

(6) U.S. patent application Ser. No. 10/066,346 filed on Feb. 01, 2002 and entitled "Method and System for Searching a Multi-Lingual Database" which application has now issued as U.S. Pat. No. 6,952,691 on Oct. 4, 2005.

(7) U.S. patent application Ser. No. 10/229,552 filed on Aug. 28, 2002 and entitled "Universal Search Management Over One or More Networks" which application has now issued as U.S. Pat. No. 7,092,938 on Aug. 15, 2006.

(8) U.S. patent application Ser. No. 10/302,108 filed on Nov. 22, 2002 and entitled "An International Information Search and Delivery System Providing Search Results Personalized to a Particular Natural Language" which application has now issued as U.S. Pat. No. 7,039,625 on May 2, 2006.

(9) U.S. patent application Ser. No. 10/664,450 filed on even date herewith entitled "Method of Self Enhancement of Search Results Through Analysis Of System Logs"

FIELD OF THE INVENTION

The present invention relates to performing keyword searches and obtaining search results on database networks. More particularly, it relates to the improvement of the effectiveness of searches in obtaining desired search results.

BACKGROUND OF THE INVENTION

Internet text retrieval systems accept a statement for requested information in terms of a search query S made up of a plurality of keywords $T_1, T_2, \ldots T_i, \ldots T_n$ and return a list of documents that contain matches for the search query terms. To facilitate the performance of such searches on internet databases, search engines have been developed that provide a query interface to the information containing sources and return search results ranked sequentially on how well the listed documents match the search query. The effectiveness in obtaining desired results varies from search engine to search engine. This is particularly true in searching certain product support databases which can be heavily weighted with technical content and the queries tend to be repetitive. In such databases, information can be in a number of natural languages, both in analog and digital form, and in a number of different formats, and in multiple machine languages. The relevancy of the search results depends on many factors, one being on the specificity of the search query. If the search query was specific enough, the probability of getting relevant results is generally higher. For example, the probability of getting documents on 'Java exception handling' is higher for the query 'Java exception' than for the query 'exception'. At the same time, some relevant documents may be excluded by a specific search query, because the query does not contain certain combinations of terms, contains superfluous terms or address the same subject matter using different words. For instance, as shown in FIG. 1, if the query is 'video player for PC', the search engine may not be able to find and return relevant documents that are not about personal computers and/or instead of using 'video player' contain terms like 'DVD driver' or 'multimedia software'. Approaches to broaden searches by adding synonymous search terms and disregarding bad query terms are known. However, results using these known approaches have not been entirely satisfactory in turning up relevant documents and/or require additional real time examination of database logs and/or databases.

Therefore it is an object of the present invention to provide an improvement in search engine search results.

Another object of the present invention is to broaden search results to uncover relevant documents that do not contain requested query terms.

It is further an object of the present invention to provide requested information to searchers in selected technical areas.

BRIEF DESCRIPTION OF THE INVENTION

Whenever a document is going to be included into the textual database, a semantic binder is used to associate the document with one or more semantic nodes which are defined in a semantic taxonomy. When a search is performed, a search application looks through a semantic dictionary (which contains a table mapping queries to nodes on the semantic taxonomy) to see whether any corresponding semantic node can be found for the searchers query. If a match is found, the search application transforms the user's query into ["original query" OR "semantic node"] so that relevant documents, even they do not contain any user's keyword, can also be found in the database. The system binds semantic nodes arranged in a hierarchical structure of the taxonomy using a Log Analyzer which periodically looks through the system log for new queries and through textual indices for documents added to the database to generate the semantic dictionary and to bind the semantic nodes to the queries in the textual indices of the documents.

Since the above analysis arrangement is performed on all customer queries, the search system enhancements have a direct effect on customer satisfaction. Further because the query log analysis and relevant document identification is performed off-line, response time to customer queries is not affected. In addition, with the search enhancements of the present invention the search system learns from user iterations.

DETAILED DESCRIPTION OF THE INVENTION

Figure 2:
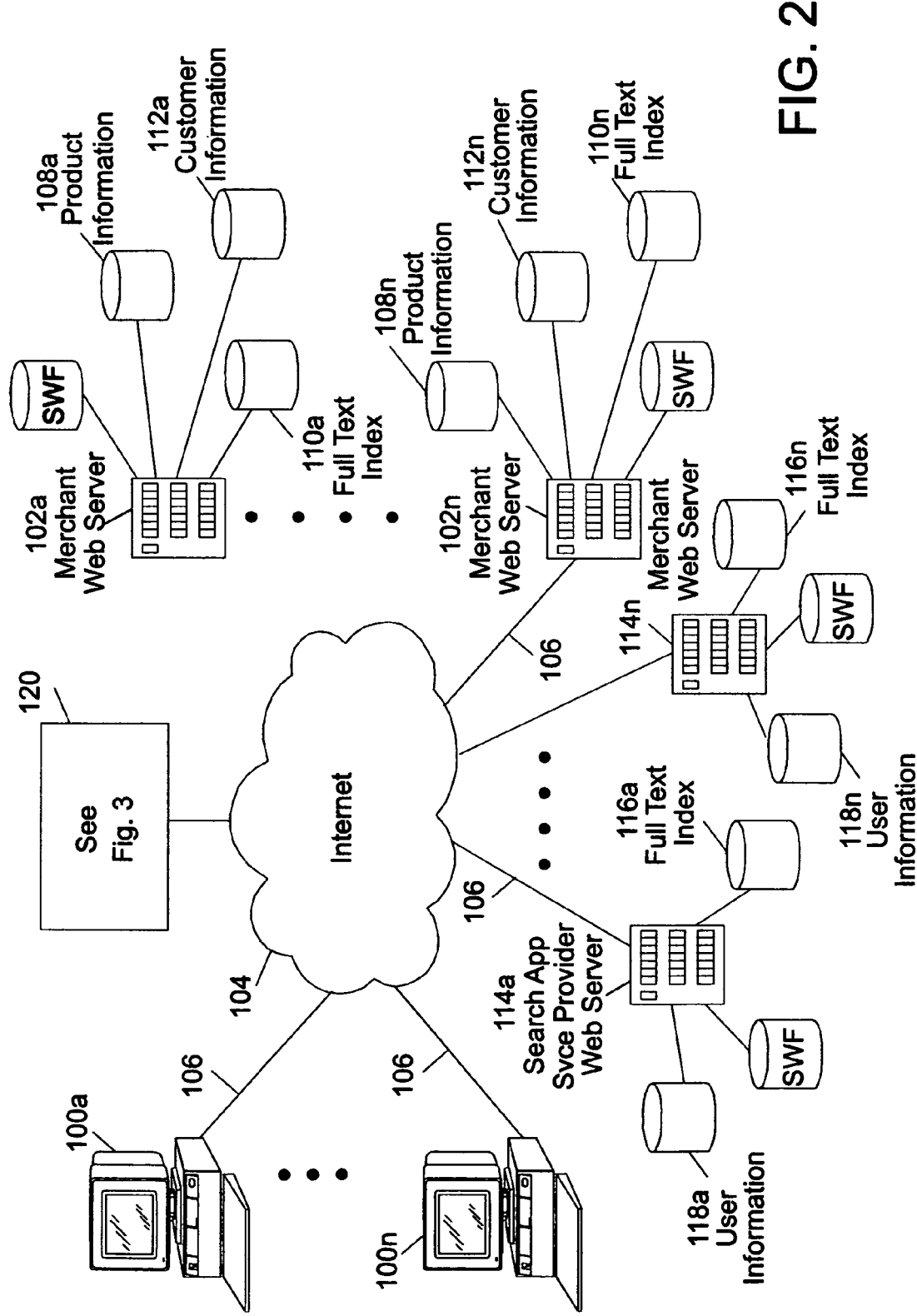
FIG. 2 is a schematic diagram for system organization of an on-line area network.

Referring now to FIG. 2, communication between a plurality of user computers 100a to 100n and a plurality of information servers 102a to 102n is accomplished via an on-line service through a wide area network such as the Internet 104 that includes network node servers. The network node servers manage network traffic such as the communications between any given user's computer and an information server.

The computers 100 are equipped with communications software, including a WWW browser such as the Netscape browser of Netscape Communications Corporation, that allows a shopper to connect and use on-line shopping services via the Internet. The software on a user's computer 100 manages the display of information received from the servers to the user and communicates the user's actions back to the appropriate information servers 102 so that additional display information may be presented to the user or the information acted on. The connections 106 to the network nodes of the Internet may be established via a modem or other means such as a cable connection.

The servers illustrated in FIG. 2, and discussed hereafter, are those of merchants which, for a fee provide products, services and information over the Internet. While the following discussion is directed at communication between shoppers and such merchants over the Internet, it is generally applicable to any information seeker and any information provider on a network. (For instance, the information provider can be a library such as a University library, a public library or the Library of Congress or other type of information providers.) Information regarding a merchant and the merchant's products is stored in a shopping database 108 to which the merchants servers 102 have access. This may be the merchants own database or a database of a supplier of the merchant. All product information accessible by the merchant servers that is publishable as web pages is indexed and a full-text index database 110 which records the number of occurrences of each of the words and their use in the location. In addition to the servers of individual merchants, and other information providers, there are the servers 114a to 114 of plurality of search service providers, such as Google of Google, Inc., which providers maintain full text indexes 116 of the products of the individual merchants 102a to 102n obtained by interrogating the product information databases 108 of the individual merchants. Some of these search service providers, like Google, are general purpose search providers while others are topic specific search providers.

The merchants and the search application service providers each may maintain a database of information about shoppers and their buying habits to customize on-line shopping for the shopper. Operations to accomplish a customized electronic shopping environment for the shopper include accumulating data regarding the shopper's preferences. Data relating to the electronic shopping options, such as specific sites and specific products selected by the shopper, entry and exit times for the sites, number of visits to the sites, etc., are recorded and processed by each merchant to create a shopping profile for the shopper. Raw data may then be processed to create a preference profile for the shopper. The profile may also include personal data or characteristics (e.g. age, occupation, address, hobbies) regarding the shopper as provided by the shopper when subscribing to the service or obtained from other sources. Profile data can help in discerning the meaning of words used in a keyword query. For instance, a keyword in the query of a medical doctor could have an entirely different meaning to the use of the same keyword presented by a civil engineer. The data accumulation on the shoppers are placed in the shoppers profile database 112 or 118 of each of the merchants. Each individual shopper's profile in the databases of the merchants and the search application service providers can differ from one to another based on the particular merchant's or service providers experience with the shopper and their profiling software. Data collection may continue during searches made by the shopper so that up-to-date profile data for the shopper is obtained and used.

With information regarding the shopper involved in the shopping transaction, the merchant is able to meet the needs of the shopper, and the shopper is presented with the opportunity to view and purchase that merchandise that is most likely to be of interest since the merchant's products and services are directed toward those shoppers who have, either directly or indirectly, expressed an interest in them.

When the search characteristics in the form for key words are entered by the shopper into the space provided on the default or home page of his/her browser, the search engine of the merchant web server 102 does a search of the accessed full text index database 110 or 118 using the key words and gets a list of documents describing those products and services that contain matches to the key words. This list of documents contain basic test ranking Tf (including the number of hits, their location, etc. which are used to order the list of documents) with documents with higher scores at the top. This list is then sent to a ranking module which will apply a ranking algorithm, such as the one described in the article entitled "The Anatomy of a Large-Scale Hypertextual Web Search Engine" by Sergey Brin and Lawrence Page of the Computer Science Department, Stanford University, Stanford Calif. 94305 (which article is hereby incorporated by reference) to rank the list of documents using the text factors and other rank factors, such as link analysis, popularity, the user's preferences from the users profile, and may also introduce factors reflecting the information, providers biases and interests. A reordered list of documents based on the ranking algorithm is then provided to the user.

Figure 1:
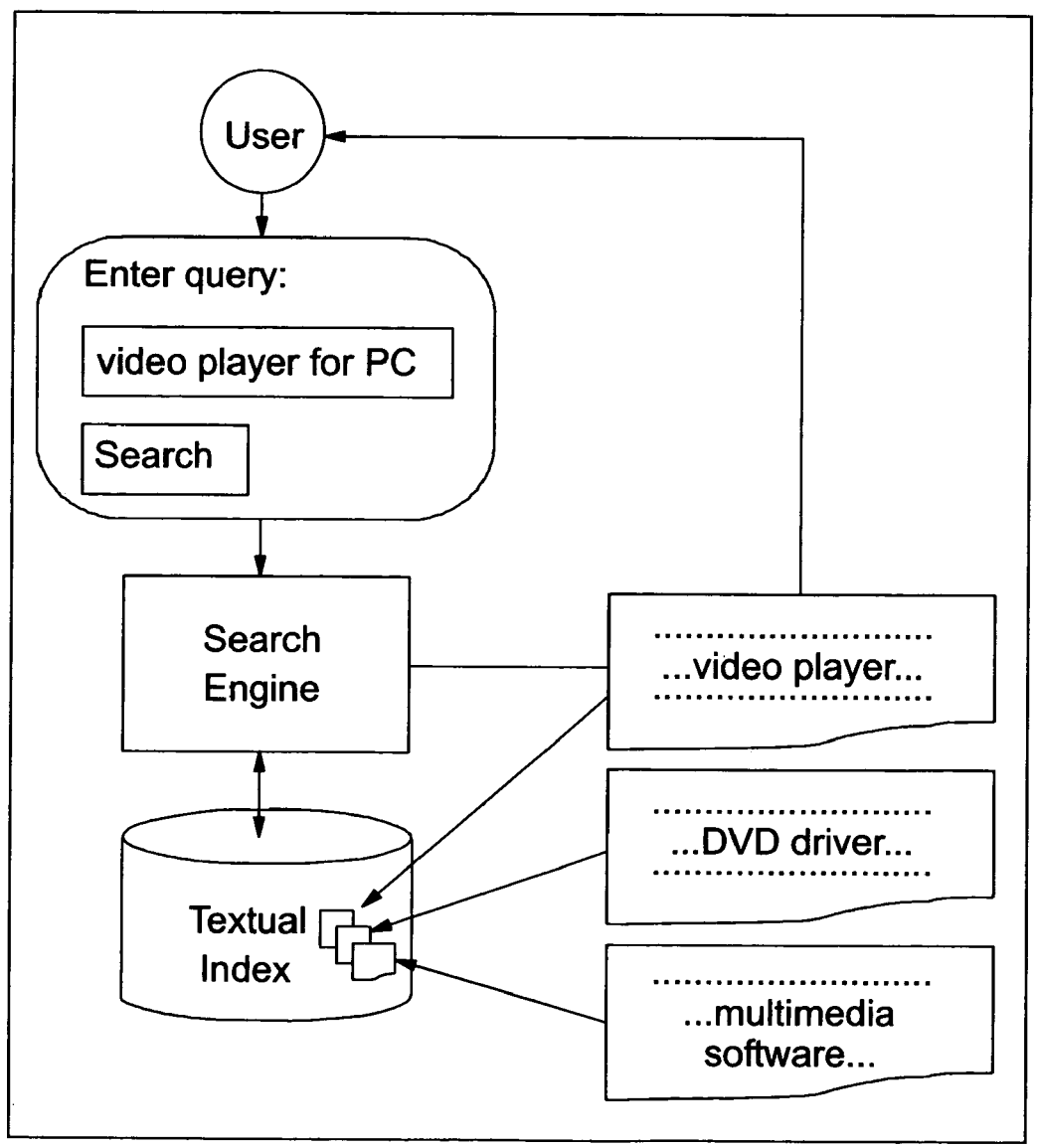
FIG. 1 is a schematic diagram illustrating limitations in a prior art search process.
Figure 3:
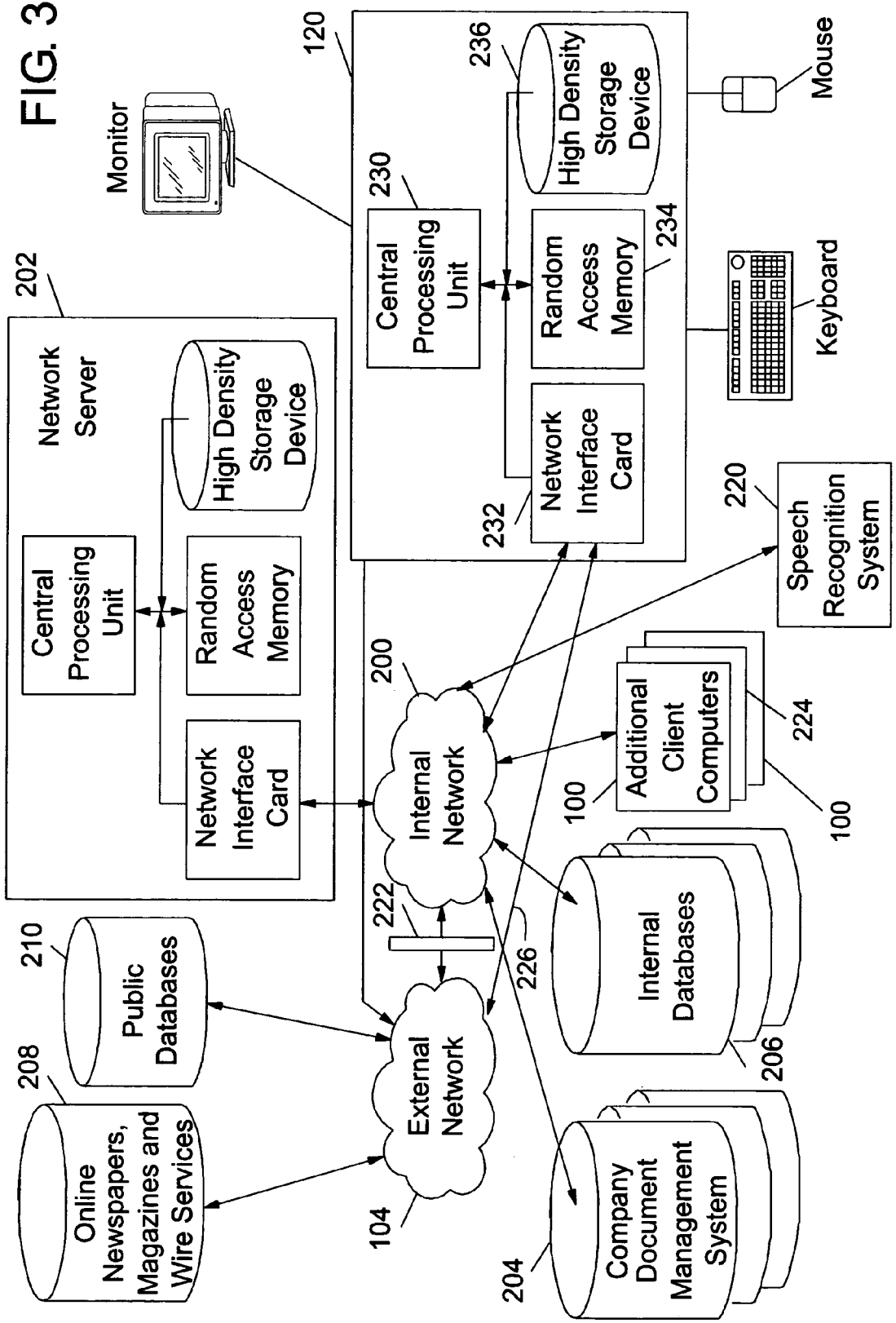
FIG. 3 is a schematic diagram of a private network incorporating the present invention and connected to the network shown in FIG. 2.

FIG. 3 shows how a multi-language internet search management server 120 can be used as one of the merchants web server 120 obtain information from the merchant and supply it to a user. As shown in FIG. 2, the search management server 120 is connected in a private intranet network 200 with a server 202 and a number of computers 100, such as those described in FIG. 1, so that the computers 100 can obtain information stored in the internal sources of the private intranet. The intranet 200 is provided with public internet access capability which provides access to services on the public internet 104. A "firewall" 222 separates the public internet 104 from the private intranet 200 allowing only those with the proper ID and password to enter the intranet 200 from the public internet 104. Internal sources of the intranet 200 are company document management systems 204, and internal databases 206. Also, intranet 200 is provided with a speech recognition system 220 capable of responding to compressed digitized data of voice commands and voice dictation provided by the client computers 100 either from an individual computer 100 or a client's network of such computers.

In the above mentioned U.S. patent application Ser. No. 10/180,195, the search management server 120 contains an integrated search management system which receives queries and information from search engines both in the intranet and internet and accesses information sources other than those that are in the intranet and internet through the computers 100. For example, voice messages transmitted to computer 224 and connected to text by a speech recognition system 220 can be stored in the integrated search management system. The integrated management server contains a central processing unit 230, network interfaces 232 and sufficient random access memory 234 and high density storage 236 to perform its functions. In addition to its connection to the intranet, the search management system contains a direct link 226 to the internet to enable access by customers of the merchant.

Recently, the number of search systems and search engines types grew rapidly. For each given domain, a diversity of specialized search engines could be presented as potential candidates offering different features and performances. While these specialized search systems are invaluable in restricting the scope of searches to pertinent classes, as pointed out above, relevant documents are missed. This is particularly troublesome in technically oriented databases where unsuccessful search queries resemble one another resulting in dissatisfaction. This invention provides a solution to this problem through a search enhancement that involves examination of previous search results received by customers in response to unsuccessful queries. Unsuccessful queries may be ones that return too few references (say less than 5) or ones that have elicited customer complaints.

Figure 4:
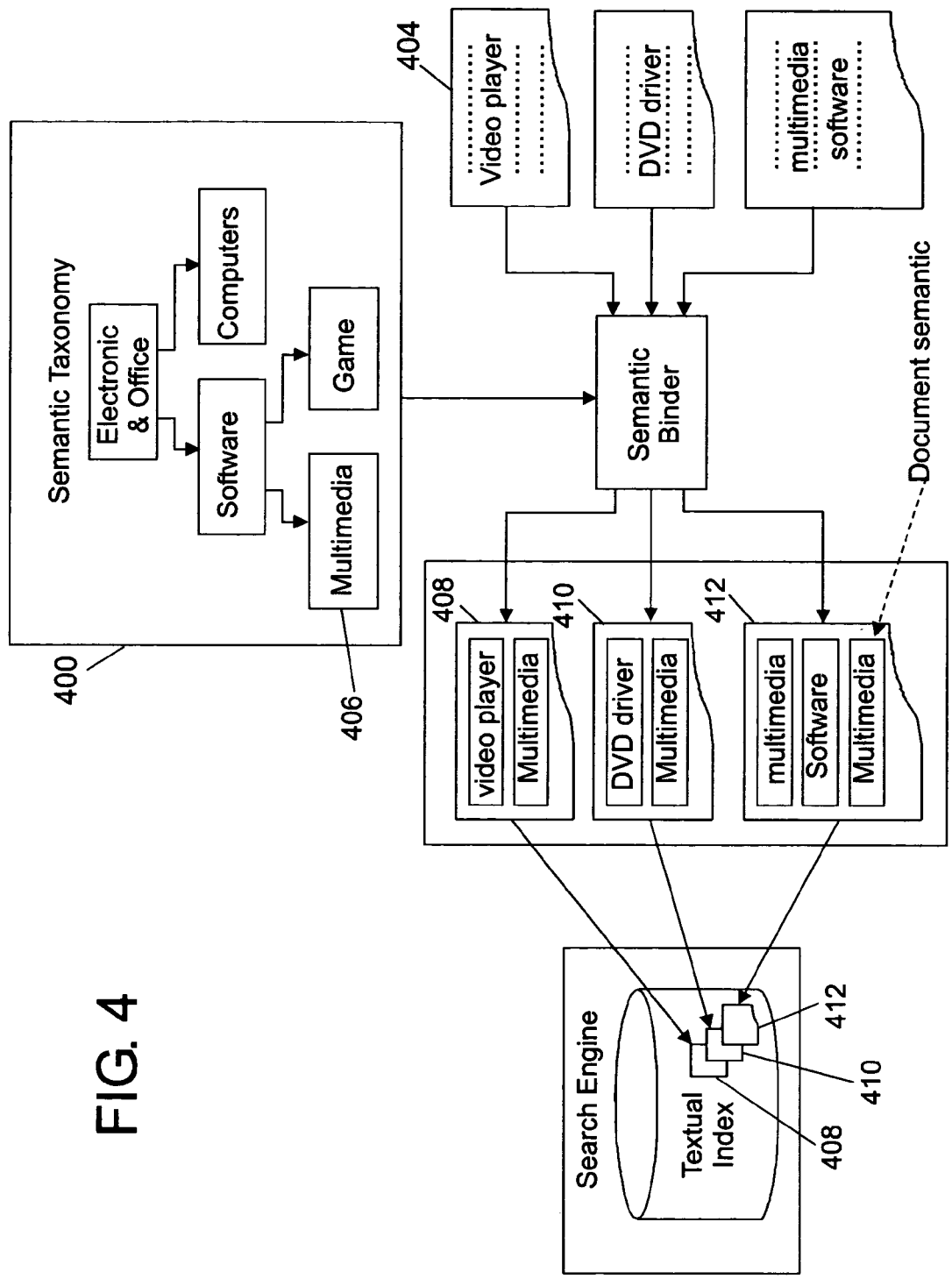
FIG. 4 is a schematic diagram showing a search system using the document semantic taxonomy of the present invention.

As shown in FIG. 4, a semantic taxonomy 400 provides an input to a semantic binder 402 which binds a semantic category in the semantic taxonomy 400 to the possible query terms appearing in documents of a database by placing the semantic category in the textual index for the documents. For instance, 'video player' 404 is bound to the semantic category "multimedia" 406 in the textual index 408 in each of the documents containing the phrase 'video player'. Similarly, the other of the terms "DVD driver" and "multimedia software" are attached to "multimedia" in the textual indices 410 and 412 in each of the documents. When a search is to be performed in the textual index 408, the search not only uses the original search terms of FIG. 1 ('video player') but also searches the semantic "multimedia" for the term Thus the search would not only turn up documents containing 'video player' but also documents containing the terms "DVD driver" and "multimedia software" bound to the same document semantic ("multimedia").

Figure 5:
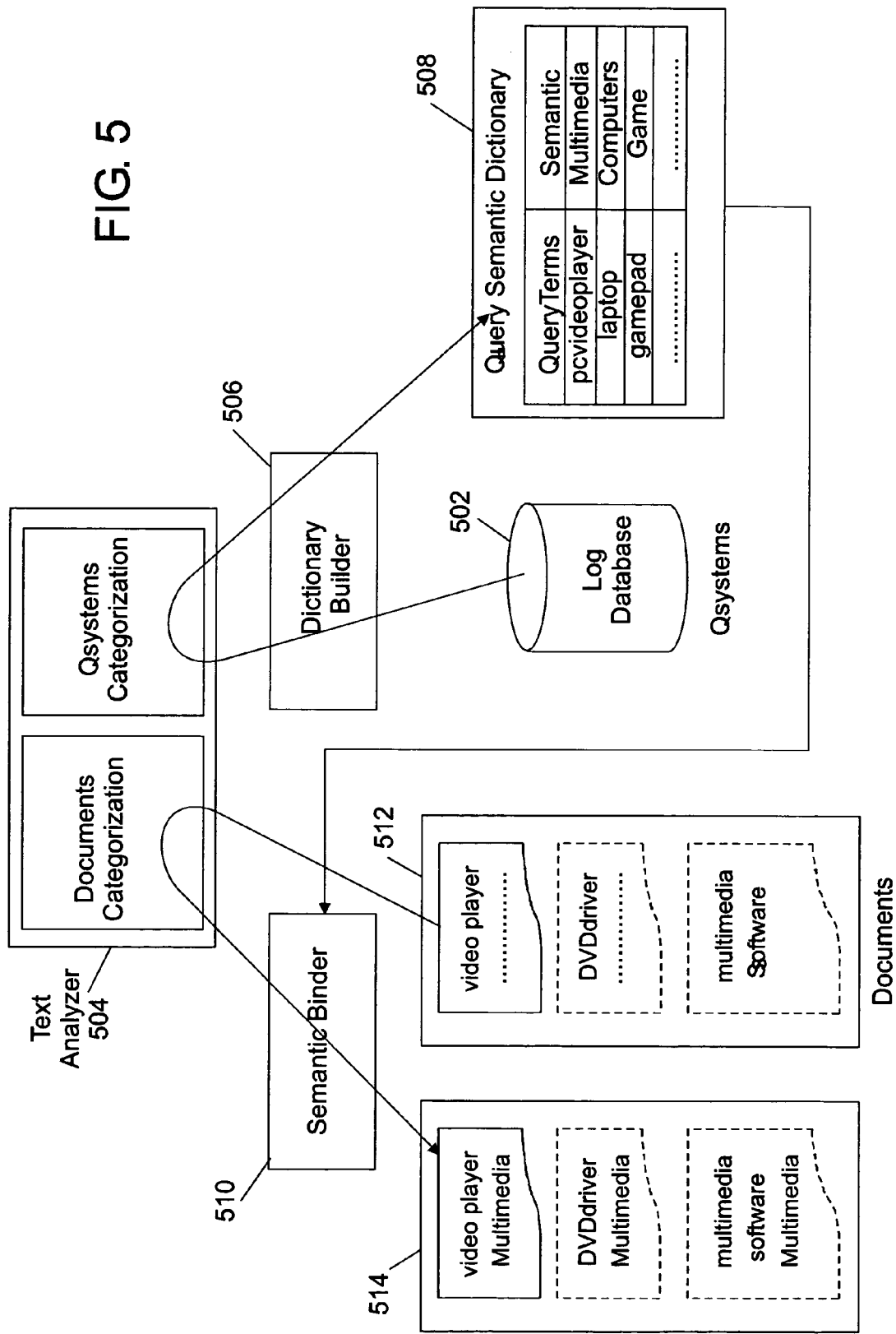
FIG. 5 is a schematic diagram showing the generation of a semantic dictionary and modification of the document textual indices for the present invention.
Figure 6:
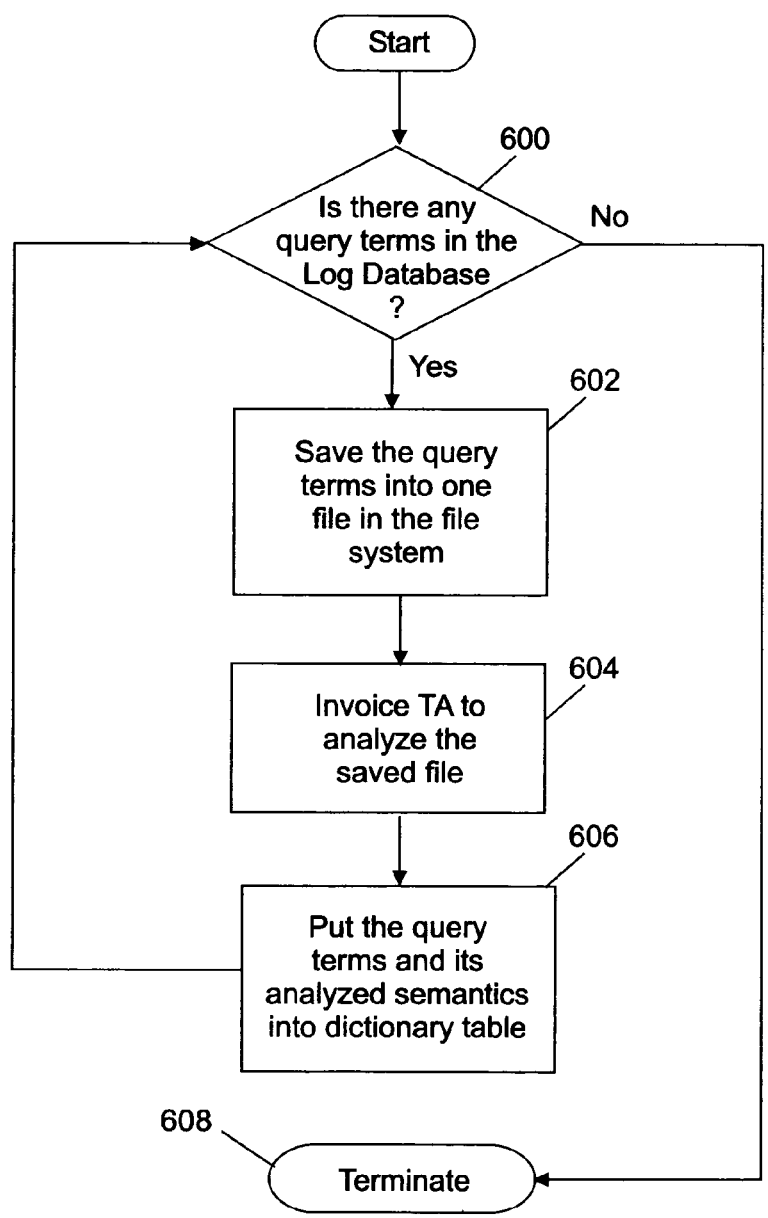
FIGS. 6 and 7 are schematic flow diagrams showing operation of the textual analyzer of FIG. 5.

As shown in FIGS. 5 and 6, whenever the system database 402 is queried by new query terms, the system accesses the log database 502 (step 600) and places the new terms in a file in the dictionary builder 506 (Step 602). The text analyzer 504 analyzes the query terms in the file (step 604) and engages dictionary builder 506 to associate the query terms in the document with one or more semantic nodes of the semantic taxonomy 400 in the query semantic dictionary 508 (step 606). When the document has been analyzed and no more documents are to be analyzed the process is terminated (step 608).

Figure 7:
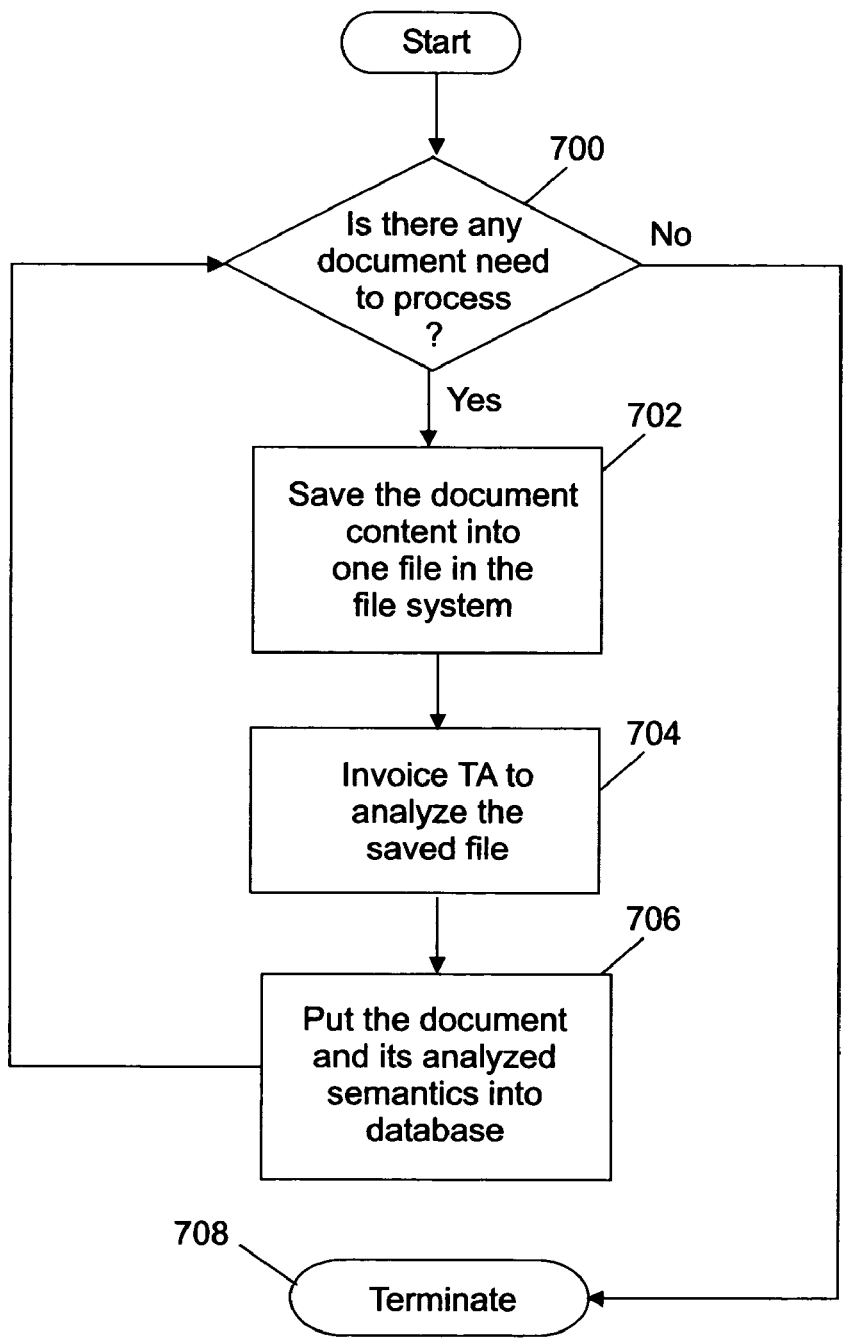

Referring now to FIGS. 5 and 7, when a new document, added to the database, is identified (step 703), the documents content is stored in the file system (step 702) and the textual analyzer 504 analyzes the saved file (step 704). Based on this analysis, the semantic binder 510 links query terms in the document 512 by placing the node term ("multimedia") with the query term in the textual index for the document (step 706). When all documents have been processed, the analysis is terminated (step 708). This binding to semantic nodes will cause the semantic nodes to be interrogated together with the link query terms.

Figure 8A:
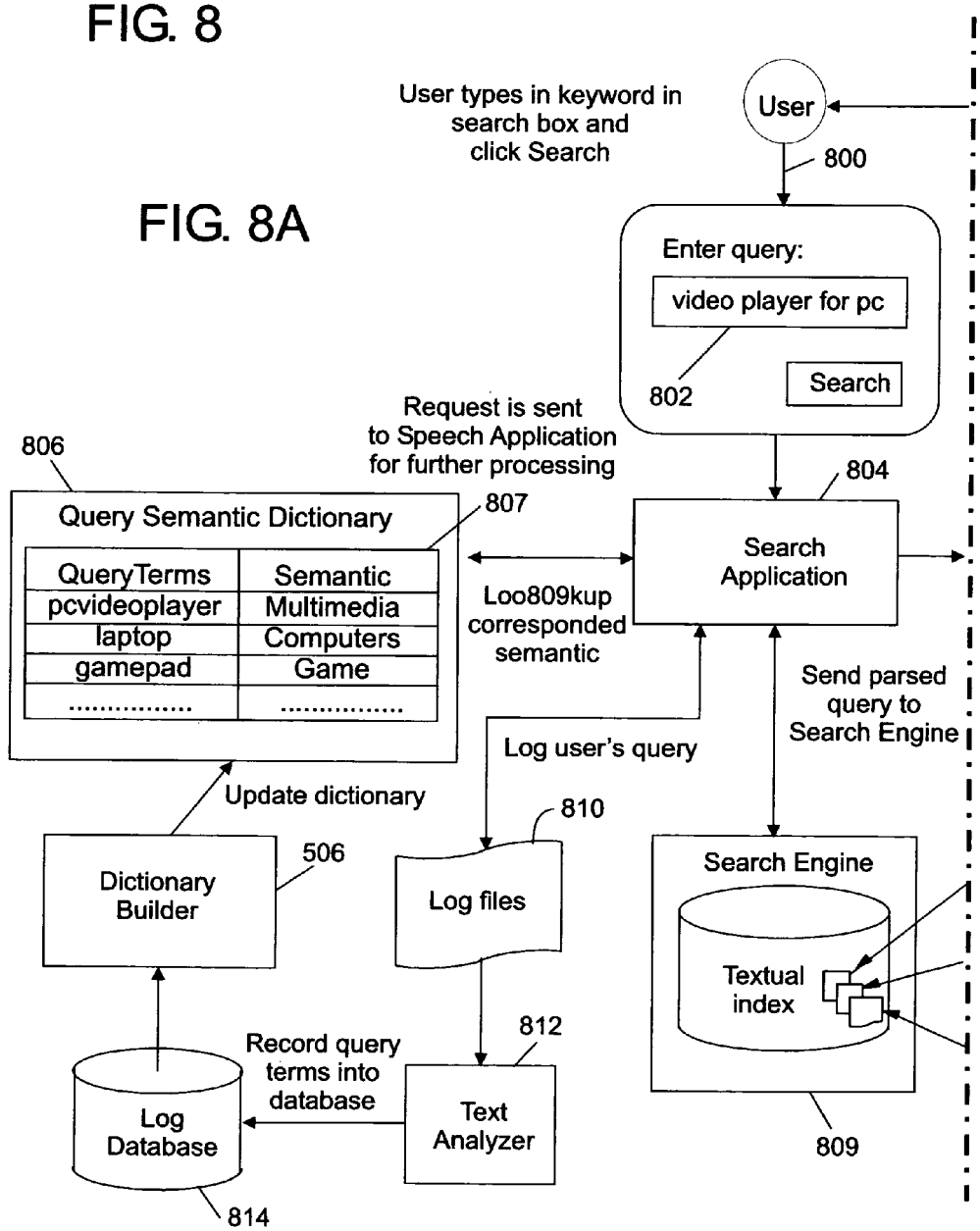
FIG. 8 is an overall operational schematic diagram showing the operation of the system of FIGS. 4 and 5.

Referring now to FIG. 8, a user logs onto the system and submits a keyword search (step 801) sending the search query 802 to the search application 804. The search application 804 looks up the query keywords in query semantic dictionary 806 to see whether any corresponding semantic node 807 can be found. If there is (are) matched semantic node(s), search application transforms user's query into["original query OR (semantic nodes)"] (here, "video player for PC" OR "multimedia") so that relevant documents (even though they do not contain any user's query keyword) can also be found in the textual index. The search application then sends the expanded query to search engine 809 and receives search results. The matched documents, including 1) documents that contain user's query keywords 408 and 2) other documents 410 and 412 that belong to the queried semantic node "multimedia", are returned to the user.

The search application places the query term 802 into the log files 810. The text analyzer 812 scans through the log files to the find query keywords processed by the search application 804 and calculates how many times a query has been submitted and records that into the log database, along with the query as described previously. Dictionary builder 816 then updates the listing query semantic dictionary based on the scanning of log files to increase the terms defined in the semantic dictionary 806. The query terms are arranged in the query semantic dictionary in order of "most often queried terms" so that the time spent looking up terms in the semantic dictionary is shortened to significantly improve search accuracy with less effort.

Figure 9:
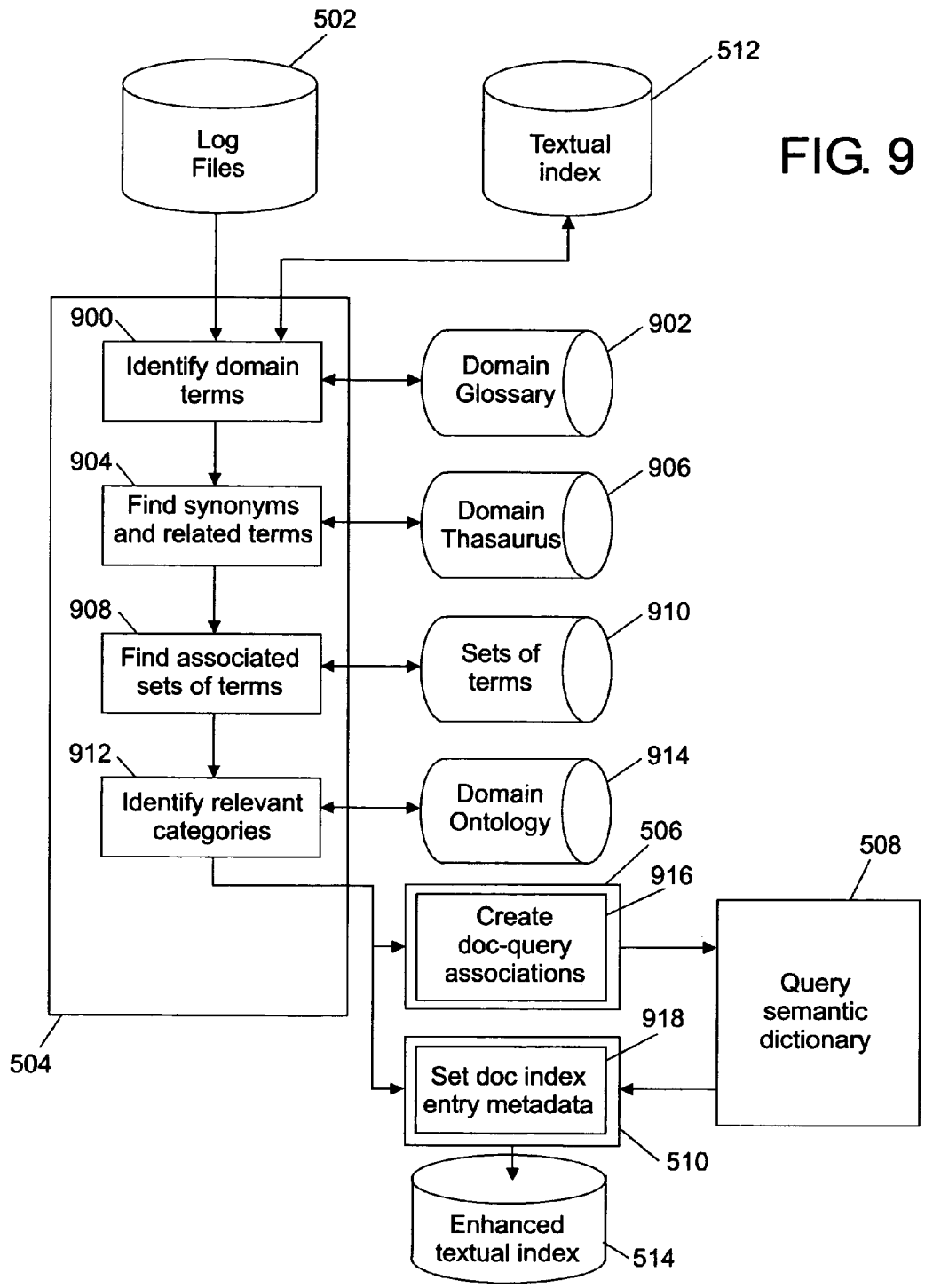
FIG. 9 is a more detailed schematic diagram of FIG. 5.

In the above figures the textual analyzer can take many forms. It can be simple lookup tables that link the semantic dictionary to the incoming queries or documents. It can also use known commercially available analysis packages for analysis of the query terms. As shown in FIG. 9, in more sophisticated systems the transaction analyzer, the semantic binder and the dictionary builder can include submodules similar to those found in FIG. 5 of copending application Ser. No. 10/664,460.

The semantic binder can include the following sub-modules:

a sub-module 900 that identifies domain specific terms in a given query, using domain specific glossary 902 relating to the semantic taxonomy.

a sub-module 904 that finds synonyms and related terms for the identified terms, using domain specific thesaurus 906.

a sub-module 908 that finds statistically close terms using listings of associated sets of terms 910.

a sub-module 912 that identifies relevant semantic taxonomy specific categories for the query terms, using domain specific ontology 914.

The dictionary builder 506 can include a sub-module 916 that binds queries in the identified semantic taxonomy categories using the results of the text analyzer 504.

The semantic binder 510 can include a sub-module 915 that adds new doc-query links to the meta-data of the textual index entries to link the documents to the semantic taxonomy categories.

The Index/Meta-data Enhancer module modifies the original Textual Index 524, creating Enhanced Textual Index that replaces the original Textual Index and allows to find more relevant documents in response to the given query.

With this design, the search application not only applies Boolean operations (AND, OR NOT) on end-user's query terms, but also it tries to figure out what the end-user is really looking for based on the info within the query semantic dictionary. For example, search on "pc video player" will also bring back all documents related to "multimedia software that can be executed on a PC."

Above described is one embodiment of the invention. Of course a number of changes can be made. For instance the techniques of the present invention generated in accordance with that copending application can be combined with those of the above mentioned copending application Ser. No. 10/664,449 filed on even date herewith to select new semantic categories as described in this application. As an example, the "multimedia" category could be divided into subcategories for "computers" and "televisions" as the number of queries relating to "video player" warranted such a distinction. Therefore it should be understood that while only one embodiment of the invention is described, a number of modifications can be made in this embodiment without departing from the spirit and scope of the invention as defined by the attached claims.

The invention claimed is:

1. A self-enhancing search system for automatically providing expanded keyword searches comprising:
a semantic taxonomy stored on least one computing device, the semantic taxonomy containing semantic node terms in a hierarchical structure, each semantic node term identifying groups of related keywords;
a search system text analyzer stored on the least one computing device, wherein the search system text analyzer periodically looks through a set of documents for a database and identifies keyword terms used in each of the documents that occur in the hierarchical structure;
a semantic binder stored on the least one computing device, the semantic binder for attaching a textual index to each of the documents in the set of the documents, the textual index for each of the documents including at least one semantic node term that identifies keyword terms used in the document;
a semantic dictionary stored on the at least one computing device, the semantic dictionary including a table that maps user query terms to semantic node terms in the semantic taxonomy; and
a relevant document finder stored on the least one computing device, which, only in response to a mapping, based on the semantic dictionary, between a keyword query term in a users keyword query entry with a semantic node term, automatically, without user intervention, enhances the users keyword query entry with the semantic node term to create an enhanced keyword query, the enhanced keyword query including both the keyword query term and the semantic node term, and, based on the enhanced keyword query, locates documents in the set of documents that contain a match for the keyword query term and documents in the set of documents that do not contain a match for the keyword query term in the users keyword query but contain other keyword search terms that are linked to the keyword query term by the semantic node term mapped to the keyword query term in the semantic dictionary to thereby increase the number of documents returned to the user.

2. The search system of claim 1 including a semantic dictionary builder which systematically examines the system log off line for new keyword queries to increase the keyword terms in the hierarchical structure and associate them with one or more semantic node terms used to identify the nodes of that structure.

3. The search system of claim 2 including ranking the results of searches using the enhanced queries to place terms in the semantic dictionary in order of most often used keyword query terms to reduce table lookup time.

4. The search system of claim 3, wherein the semantic dictionary builder includes:
a sub-module that identifies domain specific terms in a given keyword query, using domain specific glossary;
a sub-module that finds synonyms and related terms for the identified keyword query terms, using a domain specific thesaurus;
a sub-module that finds that statistically close terms to the identified keyword query terms; and
a sub-module that identifies relevant domain specific categories for the identified keyword terms, using domain specific ontology.

5. The search system of claim 4, wherein the dictionary builder includes:
a sub-module that binds keywords in the identified categories of the hierarchical structures, using the results of the text analyzer.

6. The search system of claim 5, wherein the semantic binder includes:
a sub-module that adds new doc-query links to the meta-data of the corresponding textual index entries to link the documents to the semantic node terms in the hierarchical structure.

7. A computer program comprising program code embodied in at least one non-transitory computer-readable storage medium, which when executed, enables a computer system to implement a method of automatically providing expended keyword searches to increase the scope of keyword searches, the method comprising:
creating a semantic taxonomy containing semantic node terms in a hierarchical structure, each semantic node term identifying groups of related keywords;
periodically looking through a set of documents for a database to identify any keyword terms used in each of the documents that occur in the hierarchical structure;
attaching a textual index for to each of the documents, the textual index for each of the documents including at least one semantic node term that identifies a keyword term used in the document;
creating a table that maps user query terms to semantic node terms in the semantic taxonomy for a semantic dictionary; and
automatically, without user intervention, and only in response to a mapping, based on the semantic dictionary, between a keyword query term in a users keyword query entry with a semantic node term, enhancing the users keyword query to create an enhanced keyword query by adding the semantic node term to the keyword query term, the enhanced keyword query including both the keyword query term and the semantic node term; and,
based on the enhanced keyword query, locating documents in the set of documents that contain a match for the keyword query term in the users keyword query and documents in the set of documents which do not contain a match for the keyword query term in the users keyword query but contain other keyword search terms that are linked to the keyword query term by the semantic node term mapped to the keyword query term in the semantic dictionary to thereby increase the number of documents returned to the user.

8. The computer program of claim 7, the method further comprising systematically off line examining new user keyword queries in a system log to increase the keyword terms in the semantic dictionary and associates them with one or more semantic node term.

9. The computer program of claim 8, the method further comprising ranking the results of searches using the enhanced queries to place keyword query terms in order of most used keyword terms to reduce table lookup time.

10. The computer system program of claim 9,
identifying domain specific keyword terms in a given query, using domain specific glossary;
finding synonyms and related terms for the identified keyword terms, using domain specific thesaurus;
finding other statistically close keyword terms; and
identifying relevant domain specific categories for that identified keyword terms, using domain specific ontology.

11. The computer program of claim 10, the method further comprising binding keyword queries in the identified semantic taxonomy categories, using the original results of the semantic binder.

12. The computer program of claim 11, the method further comprising adding new doc-query links to the meta-data of the textual index entries to link the documents to the semantic taxonomy categories.

13. A method for a computer search system to interrogate a database that automatically provides expanded keyword search queries comprising:
providing a semantic taxonomy on at least one computing device, the semantic taxonomy containing semantic node terms in a hierarchical structure, each semantic node term identifying groups of related keywords;
providing a search system text analyzer on the at least one computing device, wherein the search system text analyzer periodically looks through a set of documents for a database and identifies keyword terms used in each of the documents that occur in the hierarchical structure;
using a semantic binder stored on the at least one computing device for attaching a textual index to each of the documents in the set of documents, the textual index for each of the documents including at least one semantic node term that identifies keyword terms used in the document;
creating a table that maps user query terms to semantic node terms in the semantic taxonomy for a semantic dictionary; and
providing a relevant document finder on the at least one computing device, which, only in response to a mapping, based on the semantic dictionary, between a keyword query term in a users keyword query entry with a semantic node term, automatically, without user intervention,
enhances the users keyword query entry with the semantic node term to automatically create an enhanced keyword query, the enhanced keyword query including both the keyword query term and the semantic node term, and,
based on the enhanced keyword query, locates documents of the set of documents that contain a match for the keyword query term and documents of the set of documents that do not contain a match for the keyword query term in the users keyword query but contain other different keyword search terms that are linked to the keyword query term by the semantic node term mapped to the keyword query term in the semantic dictionary to thereby increase the number of documents returned to the user.

14. The search method of claim 13, the method further including using a semantic dictionary builder stored on the at least one computing device which systematically examines a system log off line for new keyword queries to increase the keyword terms in the semantic dictionary and associate them with one or more nodes in the hierarchical structure.

\* \* \* \* \*